Sept. 12, 1961     L. O. CARLSEN     2,999,429
DRIVE OF GEAR GENERATING MACHINE

Filed Dec. 19, 1958     3 Sheets-Sheet 1

INVENTOR.
LEONARD O. CARLSEN
BY
*Richard W. Treverton*
ATTORNEY

Sept. 12, 1961    L. O. CARLSEN    2,999,429
DRIVE OF GEAR GENERATING MACHINE
Filed Dec. 19, 1958    3 Sheets-Sheet 2

Sept. 12, 1961 L. O. CARLSEN 2,999,429
DRIVE OF GEAR GENERATING MACHINE
Filed Dec. 19, 1958 3 Sheets-Sheet 3
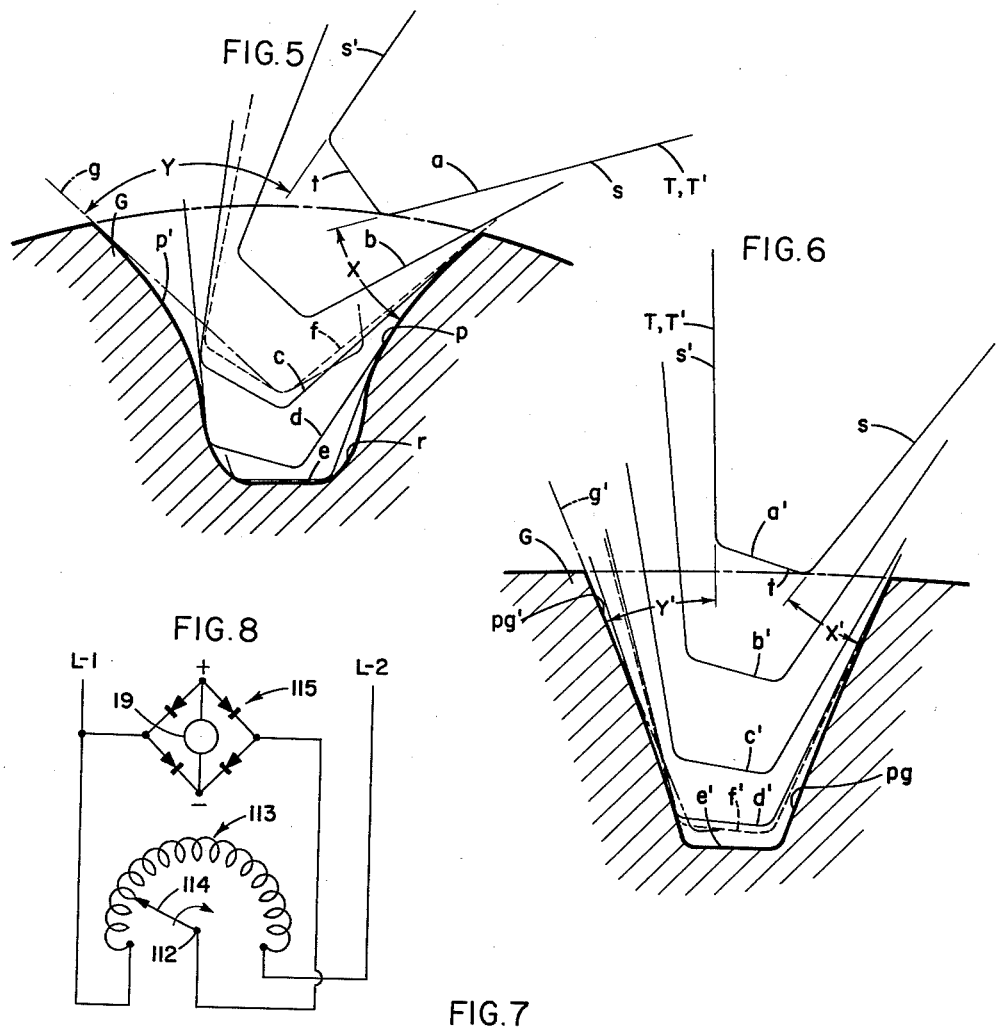
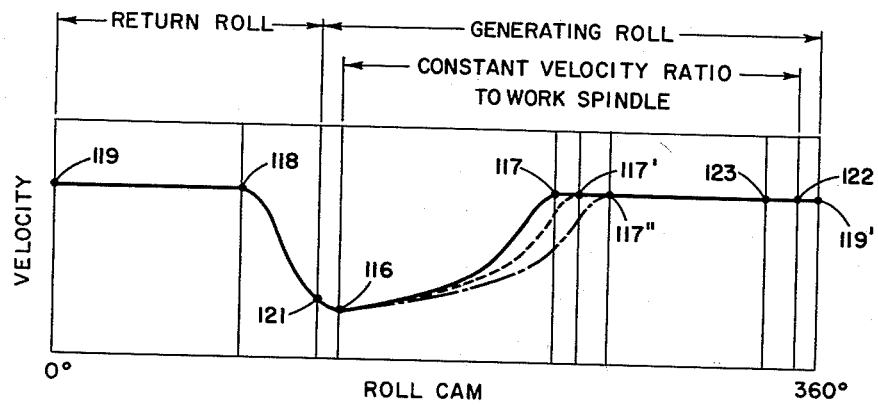

United States Patent Office 2,999,429
Patented Sept. 12, 1961

2,999,429
DRIVE OF GEAR GENERATING MACHINE
Leonard O. Carlsen, Rochester, N.Y., assignor to The Gleason Works, Rochester, N.Y., a corporation of New York
Filed Dec. 19, 1958, Ser. No. 781,591
8 Claims. (Cl. 90—6)

The present invention relates to machines for generating gears and has particular relation to the drive of such machines.

In the process of generation, for example as practiced in the cutting of bevel and hypoid gears, the tool represents a tooth of generating gear that is rolling in mesh with the work gear. In this way the surface described by the cutting edge of the tool, which is usually a straight edge, is made to envelop the curved profile tooth surface being cut. If the generation proceeds at a constant rate, the rate of feed of the tool into the workpiece varies greatly, placing an unduly heavy load on the tip edge of the tool during the initial stage of cutting. Conversely, if the feed rate is to be made constant, in order to improve the tool life, the rate of generation must be varied. Preferably the cutting speed of the tool is kept constant. Heretofore the practice has been for the same motor to drive the tool and to effect the generating motion, and, in order to provide the desired variation in rate of generation, to drive the generating train by means of a cam or equivalent speed varying device driven by such motor. However the most advantageous variation in generating rate differs from one gear design to another, so that for best results a number of such cams would be required. Unfortunately these cams are relatively large and expensive and are of necessity so mounted in the machine that exchange of them is so difficult as to be feasible only in unusual cases, as for example where the machine is to be used only for cutting gears of one single design for a long time. Accordingly only in such cases is maximum cutting efficiency usually attained.

The present invention overcomes this limitation by providing one motor for driving the cutting tool, a second motor, of the variable speed type, for driving the generating train, a device for varying the speed of the second motor, and means for actuating said device in time with operation of the generating train, to thereby effect a variation in the velocity of the generating train while the tool is cutting. Conveniently the device is one adapted to vary the voltage of the current supplied to the second motor, such for example as a variable voltage autotransformer, and the actuating means preferably comprises a cam operating in time with the generating train. The cam may be small, inexpensive, and one of a set of interchangeable cams each especially suitable for use in the cutting of gears of one particular design or range of similar designs.

A prefered embodiment of the invention is shown in the accompanying drawings, wherein:

FIGS. 5 and 6 are diagrams showing successive positions of the cutting tools during the generation of bevel gears of small and large pitch angles, respectively;

FIG. 7 is a diagram of the operating cycle of the machine; and

FIG. 8 is a wiring diagram of the speed control system for the variable speed motor.

Figure 1:
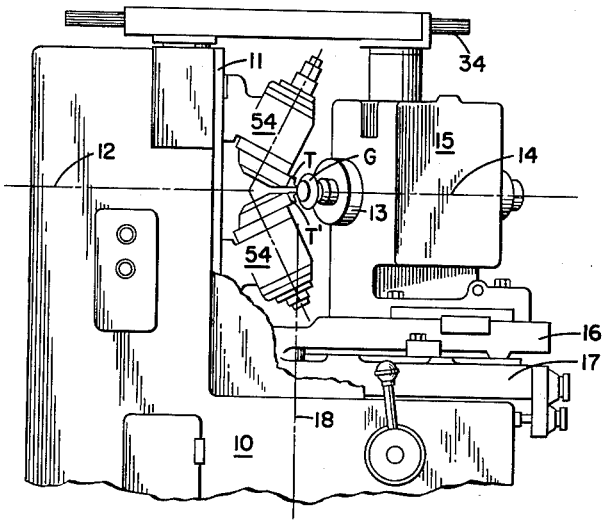
FIG. 1 is a front view and FIG. 2 a drive diagram of the machine.
Figure 2:
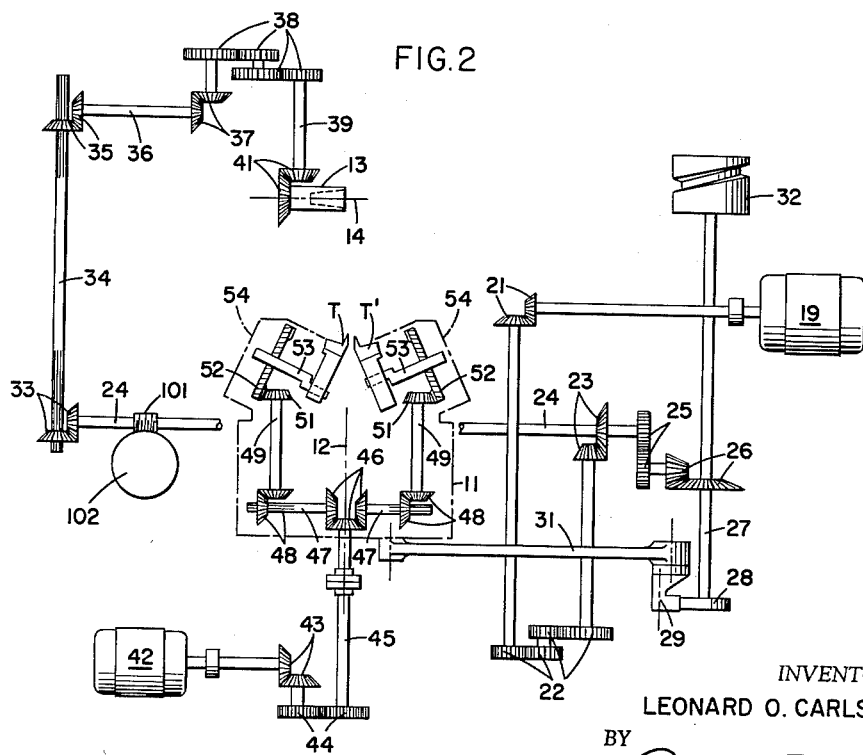

Referring to FIGS. 1 and 2, the machine comprises a frame 10 supporting a tool-carrying cradle 11 for rotation about horizontal axis 12, the tools being designated T and T'. The work gear G, in this case a bevel gear, is chucked to a work spindle 13 that is rotatable about its axis 14, which also is horizontal, in a work head 15. The work head is adjustable retilinearly, in the direction of axis 14, on a swinging base 16 that in turn is adjustable angularly on a sliding base 17 about a vertical axis 18 which intersects axes 12 and 14 at a common point. The sliding base is adjustable, and also movable for feed of the work relative to the tools, rectilinearly on frame 10 in the direction of cradle axis 12. By these several adjustments the cone apex of the gear G may be brought into coincidence with the intersection point of axes 12, 14 and 18.

In operation the cradle 11 is rotated back and forth about axis 12, in time with rotation of the work spindle 13 about axis 14, by a generating train driven by a motor 19 through bevel gears 21, rate-of-roll change gears 22, and bevel gears 23. The generating train comprises a main shaft 24, gears 25, bevel gears 26, shaft 27, cam 28, a bell crank lever 29 oscillated by the cam, and a pitman 31 which pivotally connects the lever 29 to the cradle. The arrangement is such that for each turn of shaft 27 and cam 28 the cradle is given one oscillation back and forth about its axis 12. The cam 28 is so shaped that the generating swing or roll of the cradle, during which cutting occurs, is in constant velocity ratio to the rotations of shafts 24, 27, and that the return roll is at a faster although not constant rate. A feed cam 32 on shaft 27 is arranged to act in a conventional manner, through means not shown, to advance the sliding base to bring the work gear into cutting position during the initial part of the generating roll of the cradle and to withdraw the slide, to move the work clear of the tools, during the terminal part of the generating roll. The generating train further comprises bevel gears 33, overhead shaft 34, bevel gears 35, shaft 36, bevel gears 37, index change gears 38, shaft 39, and bevel gears 41 of which the driven member is on the work spindle 13. With the arrangement described the indexing of the work occurs by the continuing rotation of the work spindle during the return roll of the cradle, whereby during each successive generating roll the tools T, T' cut in a succeeding tooth space of the work gear although usually not in the next succeeding space.

In the embodiment shown the tools are driven by a motor 42 through bevel gears 43, tool speed change gears 44, shaft 45 on cradle axis 12, bevel gears 46, shafts 47, bevel gears 48, shafts 49, bevel pinions 51, gears 52 and crank shafts 53. The latter shafts are arranged to pivot the tools back and forth, and, through mechanisms not shown, to alternately advance and retract the tool's pivot axes, whereby each tool cuts during the idle return swing of the other tool. These mechanisms, contained in tool heads 54 carried by the cradle, may be as disclosed in my application Serial No. 781,590 filed on even date herewith, now Patent No. 2,953,068 granted September 20, 1960. The heads are adjustable on the cradle 11 in such manner that the tools T and T' may represent a tooth of a generating gear of any size and shape within the range of the machine. For this purpose the shafts 49, 49 and gears 48, 48 are adjustable, together with their respective heads, radially and angularly relative to the cradle.

In operation, the tools cut while the cam 28 effects the generating roll of the cradle about its axis 12, and while the work gear G is being simultaneously rotated. At the conclusion of the generating roll, the cam 32 acts to withdraw the sliding base 17 and thereby move the work gear clear of the tools. The return roll of the cradle then occurs and during it the work gear continues its rotation, thereby bringing a successive tooth space into position for cutting during the next generating roll of the cradle. At the conclusion of the return roll the cam 32 acts to advance the sliding base, bringing the gear back into cutting position in preparation for the next generating roll. The cycle described is repeated until all the tooth spaces of the work gear have been generated.

In a bevel gear of small pitch angle and low number of teeth the tooth profile curvature is relatively great, as is shown in FIG. 5, whereas in a bevel gear of large pitch angle and high tooth number the tooth profiles are only slightly curved, as is shown in FIG. 6. Referring to FIG. 5, while cutting takes place the cutting tools T, T', whose composite profile shape is shown in outline, occupy the successive positions relative to a tooth space being cut that are indicated at $a$, $b$, $c$, $d$ and $e$. These successive positions are reached as the cradle roll about axis 12 and the work rotation about axis 14 proceed through equal angles from the beginning of cutting to the mid-point of the generation action. As shown, the tip edge $t$ of the tool profile advances into the tooth space by progressively smaller increments for equal increments of the relative generating motion, the advance being greatest from $a$ to $b$ and smallest from position $d$ to center position $e$. The working surfaces of the teeth are cut by the side edges $s$ and $s'$ of the tools, but although cutting begins in position $a$, not until dotted line position $f$ does the edge $s$ begin to generate the finished tooth profile $p$. Not until somewhat after position $e$ does the opposite edge $s'$ begin to generate the opposite tooth profile $p'$. Generation and also cutting is concluded, and withdrawal of the work gear may begin, when cutting edge $s'$ is tangent to the highest point of profile $p'$, this being the position of the tools shown by dash-dot line $g$, which is the reverse or mirror-image position of position $f$. In this instance the tooth surface generation, which extends between positions $f$ and $g$, represents a large percentage of the total generating roll, from position $a$ to position $g$, that is devoted to cutting. From position $e$ to position $g$ cutting is done only by side edge $s'$ and by the rounded corner between edges $s$ and $t$ which generates the root fillet curve $r$.

Similarly when cutting a gear of large pitch angle and high tooth number, as shown in FIG. 6, the rate of feed of the tip edge $t$ decreases as the generating roll of the cradle and work gear proceeds from position $a'$ to $b'$ to $c'$ to $d'$ and to center-of-generation position $e'$. However a much smaller portion of the roll is devoted to actual tooth surface generation than in the case shown in FIG. 5, for while cutting occurs from position $a'$ to position $g'$ wherein side cutting edge $s'$ is tangent to the tooth profile $pg'$ at the top of the latter, the generation of profiles $pg$ and $pg'$ occurs only during the motion from position $f'$ to position $g'$.

It has been determined empirically that when the generating roll has continued for approximately three quarters of its angular extent from the beginning of cutting, position $a$ or $a'$, to center-of-generation position $e$ or $e'$, i.e. when it has proceeded to about position $d$ or $d'$, the feed rate of edge $t$ is small enough to prevent damage to the tips of the tools when the rate of roll is the maximum that is feasible for generation of tooth side $p'$ or $pg'$, and for the return roll. Accordingly, for cutting in the minimum time without damage to the tips of the tools, the rate of roll should be minimum at position $a$ or $a'$ and accelerate from there to a maximum at position $d$ or $d'$. However it is to be noted that in the case illustrated in FIG. 5 the angle of roll, designated X, during which acceleration should occur, from position $a$ to position $d$, is approximately half of the total angle of roll during which cutting takes place, designated Y, whereas in the case of FIG. 6 the corresponding angle X' in which the rate of roll should accelerate, from position $a'$ to position $d'$, is a substantially larger portion of the total angle Y' from $a'$ to $g'$. In order to deal with such different cases, the machine is provided with the means for varying the speed of motor 19 that are now to be described.

Figure 3:
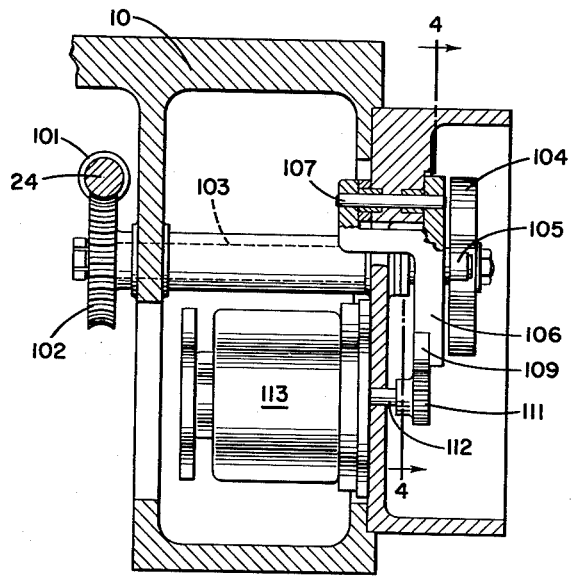
FIG. 3 is a detail sectional view showing the motor-speed-control device and the actuating means therefor, the view being in plane 3—3 of FIG. 4.
Figure 4:
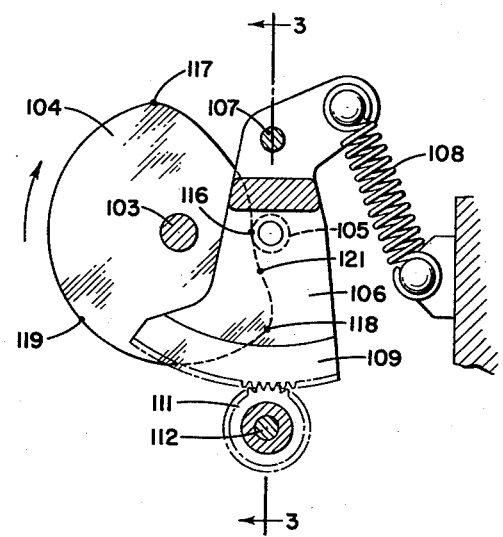
FIG. 4 is a sectional view in plane 4—4 of FIG. 3.

Referring to FIGS. 2, 3 and 4, a worm 101 secured to the main shaft 24 of the generating train drives a worm wheel 102 keyed to one end of a shaft 103 journaled for rotation in frame 10. To the opposite end of the shaft there is detachably secured a disc cam 104, which may constitute one of a set of interchangeable cams. A cam follower roller 105 is carried by a lever 106 that is pivoted to the frame by pin 107. A spring 108 arranged to act between the lever and the frame constantly urges the lever clockwise, in FIG. 4, about the axis of pin 107, to thereby maintain the follower against the cam. The lever carries a gear segment 109 which meshes with a pinion 111 secured to the shaft 112 of a variable voltage autotransformer 113 that is mounted on the frame, this transformer being the device employed in this embodiment of the invention for varying the speed of motor 19. Referring to FIG. 8, the winding of the autotransformer is connected across leads L–1 and L–2 that extend from a suitable source of alternating current, and in the secondary circuit of the autotransformer, which includes a contact finger 114 carried by shaft 112, a rectifier unit 115 is connected. The motor 19 is connected across the positive and negative direct current junctions of this unit.

The arrangement is such that as the cam 104 is rotated, clockwise in FIG. 4, the peripheral portion thereof between points 116 and 117 acts on follower 105 to swing the lever 106 counterclockwise, turning the shaft 112. This moves the contact finger 114 along the transformer winding, to increase the number of turns of the winding in the secondary circuit and so increase the D.C. voltage applied to motor 19. The motor responds by accelerating the angular motion of the generating train including main shaft 24. This angular velocity of the train remains constant, at its maximum value, as the dwell portion of the cam, which extends counterclockwise from point 117 to point 118, passes beneath the follower roller. Then, when the portion of the cam from point 118 to point 116 is effective, the shaft 112 is turned counterclockwise, to effect decrease of the angular velocity of the generating train. The gearing employed in the machine is such that cam 104 makes one revolution for each rotation of cradle roll cam 28. Thus the cam 104 and cam follower 105 constitute a means arranged to operate in time with the generating train for actuating the autotransformer, and to thereby effect a variation of the rate of rotation of the cradle and work spindle during gear tooth generation.

The graph, FIG. 7, shows how this variation is related to the angular position of cam 28 throughout one complete turn of the latter. Cam 28 is so shaped and angularly positioned on shaft 27 that it effects the return roll of the cradle during a minor fraction of its revolution, when the part of cam 104 from point 119 counterclockwise to point 121 is effective, and that it effects the generating roll during the remaining major fraction of its revolution, when its part from point 121 counterclockwise to point 119 (point 119' in the graph) is effective. During most of the uproll, between points 116 and 122 on the graph, the cradle rotation effected by cam 28 is in constant velocity ratio to rotation of the generating train, including work spindle 13, although by reason of varying speed of motor 19 it is of varying velocity in an absolute sense. As much as possible of the constant-velocity-ratio portion of the generating roll is employed for cutting, preferably all except the portion between points 123 and 122 which is devoted to withdrawal of the sliding base 17. Accordingly the portion between points 116 and 123 is available for cutting.

For cutting a gear of small pitch angle and tooth number, the condition shown in FIG. 5, where the angle of roll during which cutting takes place (from position $a$ to position *d*) is approximately half of the total roll (from *a* to *g*), the cam 104 is so shaped that point 117, where acceleration of the generating train ends, occurs half way between points 116 and 123. However, for cutting gears of average pitch angle (mitre and near-mitre gears) the average tooth number, a cam of different shape is inter-changed for cam 104, to extend the period of acceleration as shown by the dotted line in FIG. 7 to point 117′. Or in case of gears of high pitch angle and tooth number, illustrated in FIG. 6, still another cam may be inter-changed for cam 104, to extend the period of acceleration, as shown by the dash-dot line, to point 117″. In instances where the machine is used for cutting relatively small quantities of gears of any one design, a set of three cams will ordinarily suffice to cut with reasonable efficiency the entire range of gears which can be cut on the machine. However, if a very large quantity of gears of any one design is to be produced, it may be preferable in the interest of the highest possible efficiency to provide a special cam 104 that is so shaped as to place the points where acceleration begins and ends (corresponding to points 116 and 117) in the most favorable positions in accordance with the principles hereinbefore explained.

The invention has been disclosed as applied in the preferred manner to a gear generating machine of one known type, wherein the tools are oppositely stroking and indexing is effected by continuance of unidirectional work spindle rotation during the return roll of the cradle, but as will be apparent to those skilled in the art the invention is also applicable to other known types, such for example as those having rotary cutters, and those having intermittent indexing mechanisms, such for example as the types of machines disclosed in my prior Patents 2,000-215 and 2,352,689.

I claim as my invention:

1. A gear generating machine comprising a rotatable cradle, a cutting tool and a rotatable work spindle of which one is carried by the cradle, a generating train connecting the spindle and the cradle for simultaneous rotation for gear generation, a first motor for driving the cutting tool, a second motor for driving the generating train, a device for varying the speed of the second motor, and means operable in time with the generating train for actuating said device to thereby effect variation of the rate of said rotations as gear cutting proceeds, said means being arranged to progressively increase said rate from an initial phase of cutting to an intermediate point of tooth profile generation.

2. A machine according to claim 1 in which said means is arranged to cause said progressive increase to continue until the generating motions have reached approximately three-quarters of their extent from the initiation of cutting to the center-of-generation position.

3. A machine according to claim 1 in which said means is arranged to maintain said rate substantially constant from said intermediate point to the conclusion of tooth profile generation.

4. A gear generating machine having a cutting tool and a support therefor, a rotatable work spindle and a support therefor, a generating train for effecting gear generating motions comprising rotation of the work spindle in its support and simultaneous relative motion between said supports, a first motor for driving the cutting tool, a second motor for driving the generating train, a device for varying the speed of the second motor, and means operable in time with the generating train for actuating said device to thereby effect variation of the rate of the gear generating motions as gear cutting proceeds, said means being arranged to progressively increase said rate from an initial phase of cutting to an intermediate point of tooth profile generation.

5. A gear generating machine having a cutting tool and a support therefor, a rotatable work spindle and a support therefor, a generating train for effecting gear generating motions comprising rotation of the work spindle in its support and simultaneous relative motion between said supports, a first motor for driving the cutting tool, a second motor for driving the generating train, a device for varying the speed of the second motor, a cam driven by said second motor and a cam follower connected to said device, for varying the speed of said second motor as said generating motions proceed.

6. A machine according to claim 5 in which the generating train rotates the tool support in one direction during gear generation and in the reverse direction during an ensuing return motion, the cam is arranged to make one revolution during each cycle comprising a forward and a reverse rotation of the tool support, and the cam is so shaped as to cause, through its actuation of the speed varying device, operation of the generating train at an increasing rate of speed during the fore part of gear generation.

7. A machine according to claim 6 in which the cam is detachable and is one of a set of inter-changeable cams differing from one another in the extent of angular motion through which the speed increase occurs.

8. A machine according to claim 5 in which the second motor is speed responsive to applied voltage, and the motor speed varying device is a voltage-varying device.

References Cited in the file of this patent

UNITED STATES PATENTS

| | | |
|---|---|---|
| 1,871,752 | Simonds | Aug. 16, 1932 |
| 2,634,657 | Aschwanden | Apr. 14, 1953 |
| 2,846,638 | Suel | Aug. 5, 1958 |
| 2,895,384 | Baxter et al. | July 21, 1959 |